March 23, 1954 C. W. BRUGER 2,672,639
HOLDER FOR CLEANING IMPLEMENTS
Filed Aug. 24, 1950 2 Sheets-Sheet 1
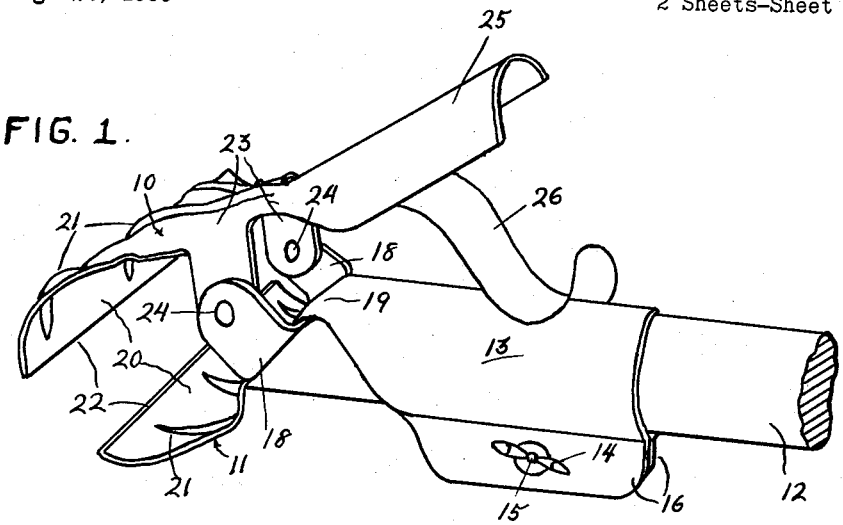
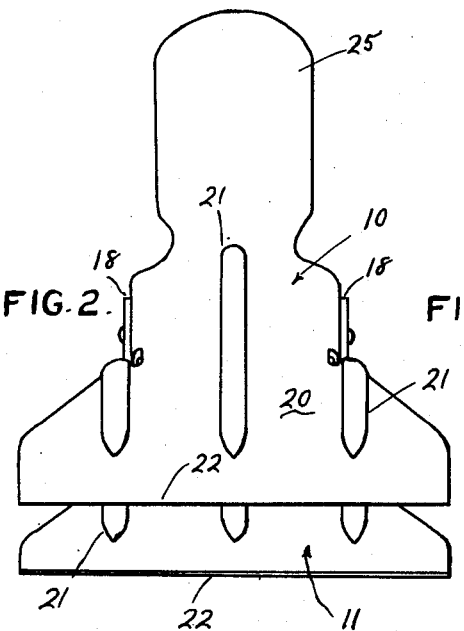
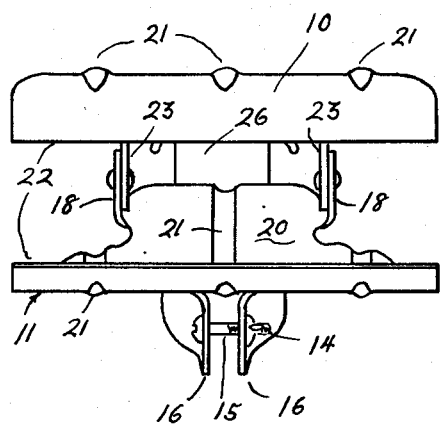
INVENTOR.
Charles Walter Bruger
BY Lee F. Townsend
ATTORNEY

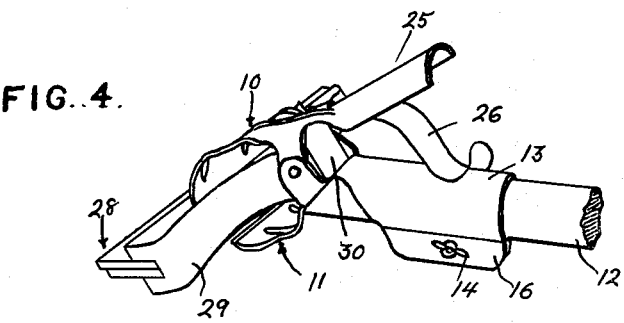
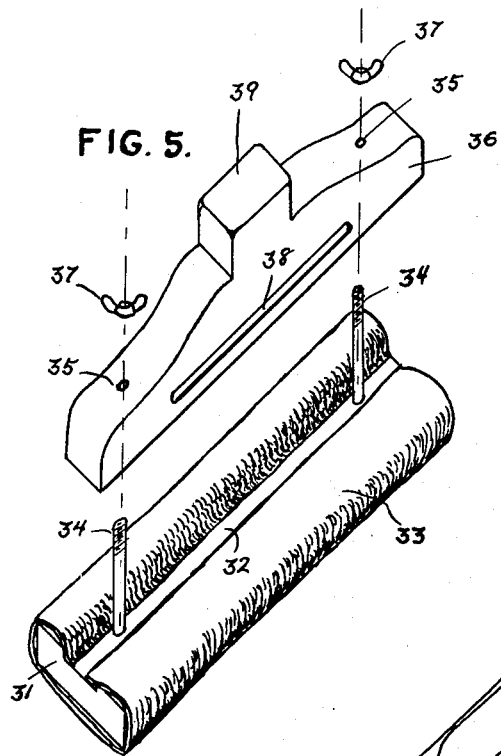
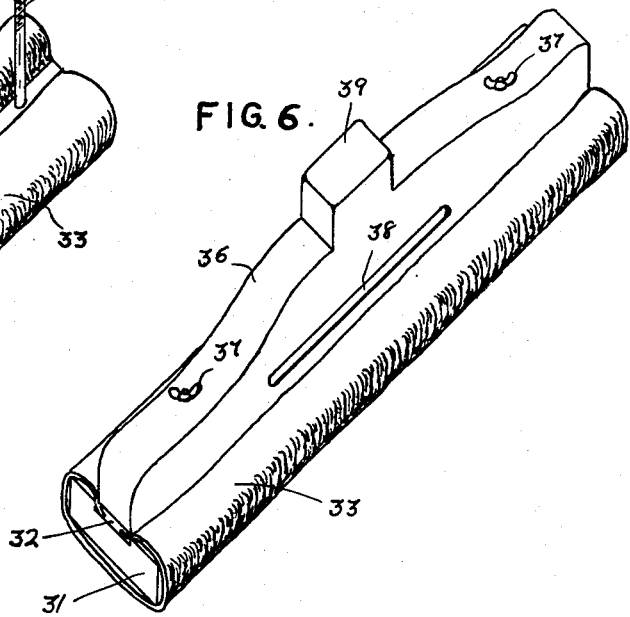

Patented Mar. 23, 1954

2,672,639

UNITED STATES PATENT OFFICE 2,672,639

HOLDER FOR CLEANING IMPLEMENTS

Charles W. Bruger, Union City, N. J.

Application August 24, 1950, Serial No. 181,193

2 Claims. (Cl. 15—148)

The present invention relates to holders for cleaning implements, such as mops, brushes, squeegees and the like, and in particular to an improved clamping head therefor.

The primary object of the invention is to provide an implement holder formed of light metal or similar material that may be economically manufactured and will result in a sturdy structure able to withstand without accidental release the stresses and strains incident to the use of the holder with the cleaning implements attached.

Another object of the invention is to provide a supplemental lock for the normal clamping action of the holder head automatically operable upon the insertion of the implement.

Other objects will become apparent from the following description taken in conjunction with the accompanying drawings, in which:

Figure 1 depicts a perspective view of the holder of this invention attached to the end of an operating handle;

Figure 2 is a top plan view of the holder;

Figure 3 illustrates a front end elevation of the holder;

Figure 4 is a perspective view of the holder with a cleaning implement clamped therein;

Figure 5 is an exploded perspective view of a waxing implement for use with the holder and Figure 6 is a perspective view of a waxing implement assembled for engagement with the holder.

My improved clamping holder comprises pivotally connected upper and lower jaws 10 and 11, respectively, that constitute an assembly for attachment to one end of a handle rod 12. The lower jaw 11 is a fixed jaw and is formed with a split cylindrical sleeve shank portion 13 adapted to be tightly and detachably secured to the handle by the clamping action of a wing nut 14 threaded on a bolt 15 that is disposed through parallel flanges 16 at the meeting edges of the split sleeve. Outwardly of the flanges 16 the sleeve carries a pair of side flanges reversely directed relative to the flanges 16 and provided each with an upwardly and forwardly directed ear 18 tangential to the sleeve. These ears are parallel and are disposed at the opposite side edges of a substantially flat portion 19 of the sleeve that is directed forwardly and downwardly at an angle to overlie the correspondingly angled butt end of the handle, whereby rotation of the lower jaw on the handle is prevented. The portion 19 at its front end merges into a longitudinally dished and laterally flared grip portion 20 formed with reinforcing ribs 21 and having a smooth, straight, front edge lip 22 which is perpendicular to the longitudinal axis of the sleeve. This lip is especially made of a blunt or rounded character to make it safe to handle. In practice, this safety feature has been found to be of particular importance.

The movable upper jaw 10 is similar to the lower jaw and is formed with an oppositely dished identical grip portion 20 having ribs 21 and a front edge lip 22. At its sides the upper jaw is provided with a pair of depending parallel ears 23 which are pivotally connected as at 24 to the ears 18 of the lower jaw. A transversely curved release grip 25 extends rearwardly above and over the lower jaw sleeve 13 and houses the forward upper end of a leaf spring 26. The upper end of the spring is suitably secured to the grip 25, and its lower end bears against and slides freely upon the sleeve 13. When the clamping holder is not in use, the jaws are maintained in a closed condition by means of the tension of the spring. For the purpose of showing the construction of the clamping holder the jaws are illustrated in an open position as shown in Figures 1–3.

The component elements of each jaw are integral, and the jaws are preferably made of light non-corrosive metal, although any suitable material may be used if desired.

It is apparent from Figure 3 that the pivotally connected ears 18 and 23 cooperate with the intermediate surface portions of the jaws to provide, in effect, a socket of rectangular cross section which receives a complemental extension on an implement when it is mounted in the holder, in the manner shown in Figure 4. In this view the implement 28 is shown as a squeegee, in which the back 29 has a central block extension 30 rectangular in cross section to pass into and fill the socket between the ears 18 and 23.

Figures 5 and 6 illustrate details of a wax applicator forming a part of a kit. The applicator comprises an elongated rectangular head 31 provided in its upper face with a longitudinal channel groove 32 to seat the ends of a wax cloth 33 that is wrapped around the head. Bolt stems 34 rigidly anchored in the head in the center line of the channel 32 extend upwardly for passage through socket bores 35 in a back 36 which is clamped against the head by wing nuts 37 threaded on the upper projecting ends of the bolt stems. The back 36 is dimensioned so that its lower edge seats in the head channel 32 over the ends of the wax cloth when the back and head are clamped tightly together, as in Figure 6, whereby the wax cloth is anchored in service position. As shown at 38, the opposite side faces of the back are longitudinally grooved to provide sockets for the lips 22 of the holder clamping jaws 10 and 11. The back also is provided on its upper edge with a central block extension 39 identical with the block 30 on the squeegee in Figure 4 and serving the same purpose. Grooves similar to the grooves 38 also are provided in the back 29 of the squeegee. They do not show in Figure 4 because of the perspective angle.

When an implement is to be used, it is engaged with the holder by inserting its back between the jaws 10 and 11 so that the central extension block of the implement is received in the socket between the ears 18 and 23, with the jaws forced slightly farther apart against tension of the spring 26. When the end of the block extension passes inwardly in the socket slightly beyond the fulcrum point of the jaws, the jaw lips 22 will snap into their receiving grooves on the side faces of the implement back under the urge of the spring. The disposition of the block extension on the implement in the socket between the ears 18 and 23 maintains the clamp jaws rigidly locked under working stress, so that the implement cannot work loose in the holder. This is due to the fact the end of the block extension engages the jaws 10 and 11 slightly beyond the fulcrum and forms a supplemental positive lock that prevents the lip 22 from springing out of the receiving grooves on the side faces of the implement back. When the implement is to be removed, manual pressure is applied on the grip 25 to compress the spring 26 and rock the upper jaw 10 sufficiently for the jaw lips 22 to clear their receiving sockets in the implement back. The implement may then be pulled easily from the clamp by a straight pull axially of the handle 12. By loosening the wing nut 14, the holder is removable from the handle, so that an entire kit of clamp holder, handle, and interchangeable implements can be stored in a relatively small space.

Although the invention has been described in connection with preferred embodiments, it is within the purview of the invention that changes and modifications in its structural details may be made to any desired extent within the scope of the invention as claimed.

I claim:

1. An implement holder comprising in combination a fixed jaw formed of light sheet metal including a body portion and a portion terminating at one end in a socket receiving the butt end of a handle, the body of said jaw being inclined relative to the socket axis, the butt end of said handle being inclined at the same angle as the jaw body and in full engagement therewith when the handle is held in the socket, a movable jaw of light sheet metal having a body terminating in a manual release grip disposed adjacent said socket, spring means therebetween biasing the jaws into clamping engagement with an implement, and a pair of transversely spaced alined side ears on the jaw bodies, the pair of ears on the movable jaw being pivotally connected to the pair of ears on the fixed jaw, the jaw bodies and ears defining a socket adapted to receive an extension on the inserted implement that extends beyond the fulcrum for the jaws and is sufficiently in face contact with said jaw bodies beyond the fulcrum to form a supplemental lock for the spring biased clamping means in normal use of the holder but permitting a slight manual movement of the movable jaw for insertion and withdrawal of the extension.

2. An implement holder comprising in combination a fixed jaw formed of light sheet metal including a body portion and terminating at one end in a socket receiving the butt end of a handle, the body of said jaw being inclined relative to the socket axis, the butt end of said handle being inclined at the same angle as the jaw body and in full engagement therewith when the handle is held in the socket, a movable jaw of light sheet metal having a body terminating in a manual release grip disposed adjacent said socket, a leaf spring secured to the under side of said grip and having a sliding contact at the other end with said handle socket to bias the jaws toward clamping engagement with an implement, grooves on opposite sides of said implement to receive the clamping edges of said jaws, cooperating ears on the side edges of said jaw bodies oppositely struck perpendicular therewith, pivots for each pair of cooperating side ears to form spaced alined side pivots for the jaw bodies, the jaw bodies and pivot ears defining a socket adapted to receive an extension on the inserted implement that extends beyond the fulcrum for the jaws and is sufficiently in face contact with said jaw bodies beyond the fulcrum to form a positive lock supplementing the spring biased clamping means in normal use of the holder but permitting a slight manual release of the clamping edges of the jaws with the implement grooves for insertion and withdrawal of the extension.

CHARLES W. BRUGER.

References Cited in the file of this patent

UNITED STATES PATENTS

| Number | Name | Date |
| --- | --- | --- |
| 158,459 | Biglin | Jan. 5, 1875 |
| 623,884 | Carter | Apr. 25, 1899 |
| 699,265 | Warlich | May 6, 1902 |
| 1,748,808 | Toyoshima | Feb. 25, 1930 |
| 2,014,490 | Brandel | Sept. 17, 1935 |
| 2,348,863 | Soule | May 16, 1944 |

FOREIGN PATENTS

| Number | Country | Date |
| --- | --- | --- |
| 604,827 | Germany | Apr. 16, 1933 |